Jan. 24, 1967   L. E. HUSTED   3,299,545
RAKE
Filed Sept. 28, 1964   2 Sheets-Sheet 1

INVENTOR.
LAWRENCE E. HUSTED
BY

ATTORNEYS

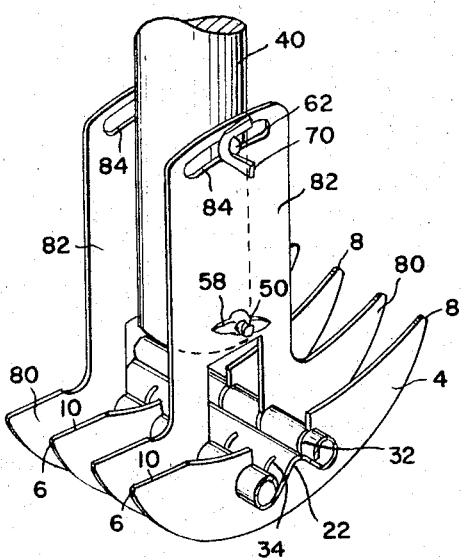
FIG. 7.
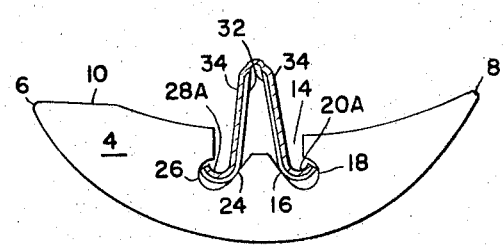
FIG. 4.
FIG. 5.
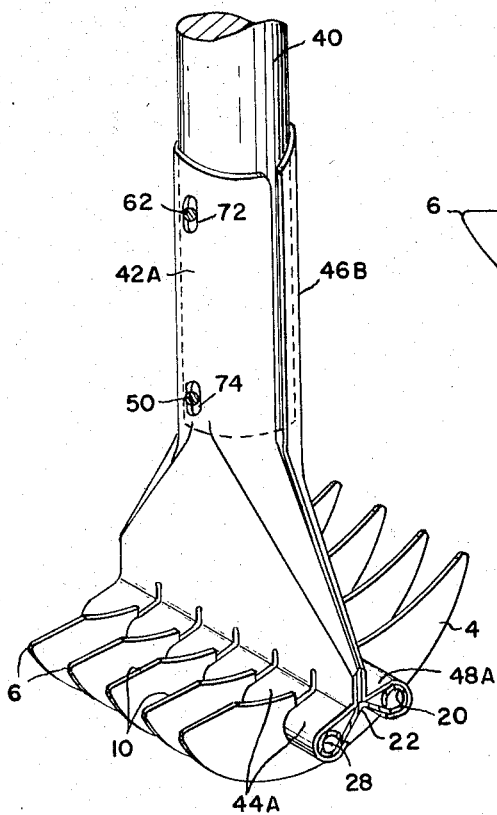
FIG. 6.
INVENTOR.
LAWRENCE E. HUSTED
BY
ATTORNEYS 3,299,545
RAKE
Lawrence E. Husted, Fairhill, Pa., assignor to Ametek, Inc., New York, N.Y., a corporation of Delaware
Filed Sept. 28, 1964, Ser. No. 399,774
7 Claims. (Cl. 56—400.16)

This invention relates to a rake and more particularly relates to a garden rake employing crescent shaped tines.

Garden rakes employing cresent shaped tines are well-known to the art. Reference may be had, for example, to United States patents, No. 1,894,306 and No. 2,355,840, each of which discloses a rake of this type. Rakes of this type have heretofore been made by the employment of one or more bars on which the tines separated by individual spacer members are mounted. This is a costly procedure from the point of view of the manufacture of the various parts required and from the point of view of the time required for assembly.

In accordance with this invention, there is provided a substantially less costly rake which can be rapidly produced in volume. The rake of this invention is further advantageous in that the tines are permanently secured to the spacer bar employed.

In addition, this invention provides novel handle means for varying the angular relationship between the spacer bar-tine assembly.

The invention and its objects will be further clarified from reading the following description in conjunction with the drawings in which:

FIGURE 4 is a vertical section through the spacer bar showing the relationship between the spacer bar and a tine before the spacer bar is secured to the tine;

FIGURE 5 is a vertical section through a spacer bar showing the relationship of the spacer bar to a tine after the spacer bar has been secured to the tine;

FIGURE 6 is a side perspective view partially broken away showing an alternative handle arrangement; and FIGURE 7 is a side perspective view partially broken away showing an alternative handle arrangement.

Figure 1:
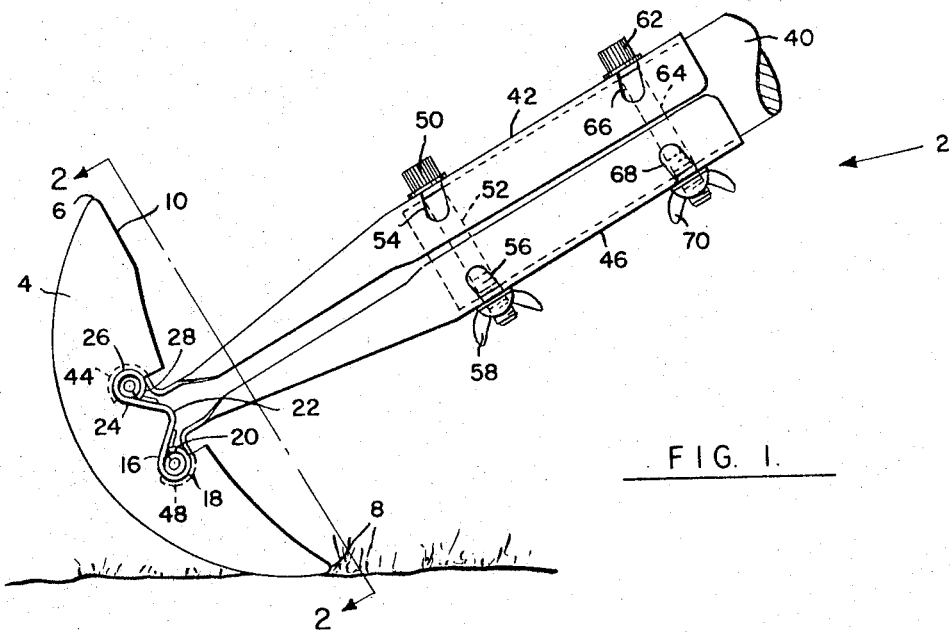
FIGURE 1 is a side elevation of a rake in accordance with the invention.

Referring now to FIGURE 1, a rake 2 in accordance with the invention has a plurality of substantially crescent shaped tines 4 having pointed ends 6 and 8. A truncated portion 10 facilitates digging tine ends 6 into the ground as is known to the art.

Figure 2:
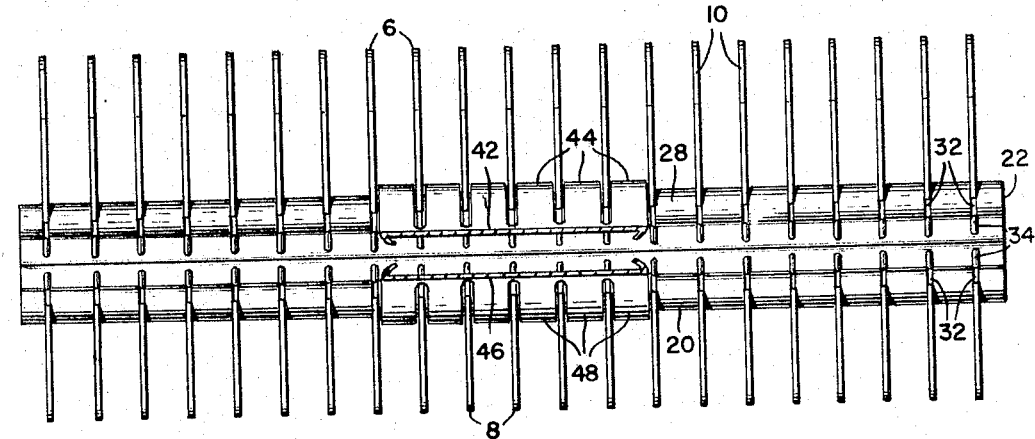
FIGURE 2 is a section taken on the plane indicated by the line 2—2 in FIGURE 1.
Figure 3:
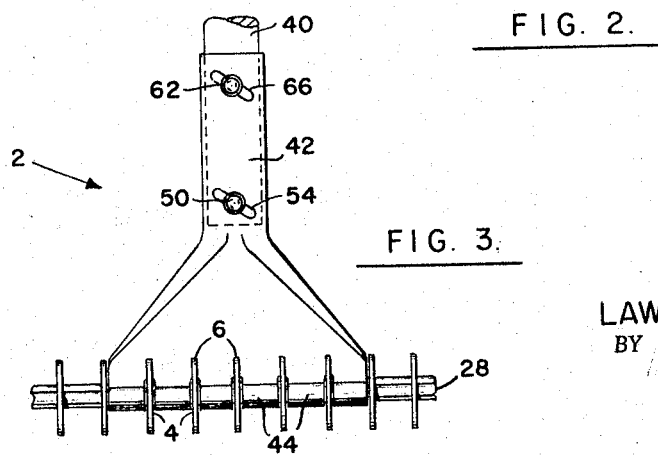
FIGURE 3 is a front elevation of the rake of FIGURE 1 partially broken away with the rake handle in a vertical position.

As best seen in FIGURE 5, each tine 4 has a cut-out central portion 14 in the concave side of the tine. A straight wall 16 and an arcuate wall 18 form an opening for the reception of the substantially round rolled edge 20 of spacer bar 22 shown in FIGURE 5 which is secured therein by a forced fit. Similarly straight wall 24 and curved wall 26 form a securing opening for the reception of substantially round rolled edge 28 of spacer bar 22 shown in FIGURE 5 which is secured therein by a forced fit. The entrances to the openings formed by walls 16 and 18 and 24 and 26, respectively are substantially narrower than the maximum width of said openings. As best seen in FIGURE 2, spacer bar 22 has a groove 32 for engagement with each of walls 16 and 18 and for engagement with each of walls 24 and 26. Each groove 32 is formed by making a bead 34. The groove 32 in the end portion of rolled edge 20 is occupied by the opposed bead 34. Similarly, the end portion of rolled edge 28 has its groove 32 occupied by the opposite bead 34.

Reference may be had to FIGURES 4 and 5 for an understanding of how the spacer bar-tine assembly is made. As shown in FIGURE 4, configuration of the original stamping for the spacer bar is such that the partially rolled edges 20A and 28A can be slid laterally into the openings formed by walls 16 and 18 and 24 and 26, respectively. A press having a V-shaped punch to engage the apex of the spacer bar original stamping is then employed to work the spacer bar downwardly which causes the rolling of edges 20A and 28A due to the die like action of walls 16 and 18 and 24 and 26.

A handle 40 is pivotally secured to spacer bar 22. A clamp member 42 engaging handle 40 has arcuate fingers 44 engaging rolled edge 28 and clamp member 46 engaging handle 40 has arcuate fingers 48 which engage rolled edge 20. A headed bolt 50 passes through an opening 52 in handle 40, an angled slot 54 in clamp member 42 and an angled slot 56 in clamp member 46. A wing nut 58 is secured to the end of headed bolt 50. A headed bolt 62 passes through an opening 64 in handle 40, angled slot 66 in clamp member 42 and angled slot 68 in clamp member 46. A wing nut 70 is secured to the end of headed bolt 62. The pitch of slots 54 and 66 are the same and opposite from the pitch of slots 56 and 68. Thus, if wing nuts 58 and 70 are loose and handle 40 is rotated clockwise as viewed from the position of one using the rake, bolts 50 and 62 will similarly be rotated clockwise causing clamp member 42 to be moved downwardly and clamp member 46 to be moved upwardly with a resultant pivoting between fingers 44 and rolled edge 28 and between fingers 48 and rolled edge 20, causing the rotation of tines 4 counterclockwise as viewed in FIGURE 1 and thus changing the angular relationship between tines 4 and handle 40. The opposite rotation of handle 40 will of course have the opposite effect. Wing nuts 58 and 70 will be screwed down tightly against clamp member 46 to hold the handle 40 against rotation when it is in the desired angular relationship with the tine 4.

A very similar handle arrangement is shown in FIGURE 6 wherein the spacer bar-tines arrangement of the rake of FIGURE 1 is employed with clamp members 42A and 46B which are identical in all respects with clamp members 42 and 46 of the embodiment of FIGURE 1 with the sole exception that each of clamp members 42A and 46B are provided with an upper vertical slot 72 for the reception of headed bolt 62 and a lower vertical slot 74 for the reception of headed bolt 50, with only slots 72 and 74 in clamp member 42A being shown in this instance since clamp member 46B is identical with clamp member 42A. With this structure, change in angular relationship between the handle and the tines is accomplished by loosening the securing wing nuts 58 and 70 (which are not shown in FIGURE 6) and holding the tines 4 in a fixed position while moving handle 40 to the desired angular position with the resultant pivoting of the fingers 44A and 48A of clamping members 42A and 46B with respect to rolled edges 28 and 20, respectively.

A still further handle embodiment is shown in FIGURE 7. Here the same assembly of spacer bar 22 and tines 4 is employed with the exception that a pair of tines 4 are eliminated with a pair of tines members 80, 80 being substituted. Tine members 80 are secured to tine bar 22 in a manner identical with the securing of tines 4 but they are provided with an upwardly extending member 82. Headed bolt 50 passes through extension members 82 to provide a pivoting axis for handle 40. Headed bolt 62 passes through an arcuate slot 84 in each extension member 82. When wing nuts 58 and 70, are loosened, it will readily be seen that the handle 40 can be pivoted about the axis of bolt 50 thus varying the angular relationship of handle 40 to the tines. The tightening down of wing nuts 58 and 70 provides for the securing of handle 40 in any desired position.

The foregoing description is by way of illustration and is not intended to be limiting.

What is claimed is:

1. A rake comprising tines each having a substantially convex lower edge and a pair of spaced openings in the upper edge of each tine,
    a spacer bar having a pair of rolled edges respectively secured in said openings by a forced fit,
    a handle, and
    means to secure the handle to the spacer bar.

2. A rake in accordance with claim 1 in which the rolled edges are substantially round in cross-section.

3. A rake in accordance with claim 1 in which each of the rolled edges has a plurality of grooves for engagement of the tines adjacent the adjacent openings in the tines.

4. A rake in accordance with claim 2 in which the spacer bar has a plurality of parallel beads and each rolled edge has a plurality of grooves in engagement with said beads respectively.

5. A rake in accordance with claim 2 in which the means to secure the handle to the spacer bar comprises a pair of clamp members engaging the handle,
    arcuate fingers on one of said clamp members with each of said fingers passing between a pair of tines and engaging one rolled edge of the spacer bar for rotatable movement with respect thereto,
    arcuate fingers on the other of said clamp members with each finger passing between a pair of tines and engaging the other rolled edge of the spacer bar for rotatable movement with respect thereto,
    means to secure the clamp members to the handle in a plurality of relative positions along the length of the handle to provide for affixing the handle in a plurality of angular positions with respect to the tines.

6. A rake in accordance with claim 5 in which the means to secure the clamp members to the handle comprises a bolt passing through an opening in the handle and passing through a slot in each of said clamp members with the slots having different pitches and means to secure said bolt to said clamp members whereby when said securing means is loose, the rotation of the handle will cause the bolt to vary the relative positions of the clamp members along the length of the handle and thus vary the angular relationship between the handle and the tines.

7. A rake in accordance with claim 5 in which a bolt passes through an opening in the handle and through a slot in each of the clamp members,
    said slots extending in the direction of the length of the handle, and
    means to secure the bolt to the clamp members whereby on the loosening of the securing means, the relative positions of the clamp members along the length of the handle can be varied.

References Cited by the Examiner

UNITED STATES PATENTS 3,193,999   7/1965   Hester _____ 56—400.16

ANTONIO F. GUIDA, *Acting Primary Examiner.*